United States Patent
Kreutzer et al.

(10) Patent No.: US 11,086,873 B2
(45) Date of Patent: *Aug. 10, 2021

(54) QUERY-TIME ANALYTICS ON GRAPH QUERIES SPANNING SUBGRAPHS

(71) Applicant: Microsoft Technology Licensing, LLC., Redmond, WA (US)

(72) Inventors: Tor Kreutzer, Tromsø (NO); Steffen Viken Valvåg, Tromsø (NO); Åge Kvalnes, Tromsø (NO); Amund Kronen Johansen, Tromsø (NO); Jan-Ove Almli Karlberg, Tromsø (NO); Dag Steinnes Eidesen, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,309

(22) Filed: Sep. 30, 2019

(65) Prior Publication Data

US 2020/0026704 A1 Jan. 23, 2020

Related U.S. Application Data

(63) Continuation of application No. 15/282,718, filed on Sep. 30, 2016, now Pat. No. 10,467,229.

(51) Int. Cl.
*G06F 16/242* (2019.01)
*G06F 16/2453* (2019.01)
*G06F 16/901* (2019.01)
*G06F 16/951* (2019.01)

(52) U.S. Cl.
CPC .... *G06F 16/24549* (2019.01); *G06F 16/2425* (2019.01); *G06F 16/9024* (2019.01); *G06F 16/951* (2019.01)

(58) Field of Classification Search
CPC .......... G06F 16/24549; G06F 16/2425; G06F 16/951; G06F 16/953; G06F 16/9532; G06F 16/9538; G06F 16/9024
See application file for complete search history.

(56) References Cited

U.S. PATENT DOCUMENTS

2008/0243770 A1* 10/2008 Aasman ................. G06F 16/28
2012/0047149 A1* 2/2012 Zhou ..................... G06F 40/205
707/748
2020/0272754 A1 8/2020 Kreutzer et al.

OTHER PUBLICATIONS

"Office Action Issued in European Patent Application No. 17794552.4", dated May 27, 2020, 9 pages.
(Continued)

*Primary Examiner* — Jorge A Casanova (57) ABSTRACT

Reductions in latencies and improvements in computational efficiency when analyzing data stored in a relational graph by integrating analytical capabilities into graph queries. Instead of a user having to run a graph query and then perform analytics on the resulting subgraph via separate requests, the user is enabled to run analytics at the time the graph query is run via a single request to the database maintaining the relationship graph, which improves the computationally efficiency of analyzing relational graphs and thereby improves the functionality of the computing devices hosting the relational graphs and running the queries and analytics.

20 Claims, 4 Drawing Sheets

(56) References Cited

OTHER PUBLICATIONS

"Non Final Office Action Issued in U.S. Appl. No. 16/268,783", dated Sep. 27, 2019, 14 pages.
"Office Action Issued in European Patent Application No. 17783664.0", dated Feb. 19, 2021, 6 pages.

\* cited by examiner

FIG.4

QUERY-TIME ANALYTICS ON GRAPH QUERIES SPANNING SUBGRAPHS

CROSS-REFERENCE TO RELATED APPLICATIONS

This application is a continuation of U.S. application Ser. No. 15/282,718, filed Sep. 30, 2016, now U.S. Pat. No. 10,467,229, which application is incorporated herein by reference in its entirety.

BACKGROUND

In a graph database, entities are presented as nodes and relationships between those entities are presented as edges in a view of the relational graph maintained by the graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, etc. The graph query produces a subgraph of the queried relational graph that satisfies the query, which may be further analyzed by the user. Graph queries are computationally expensive to run, and may be limited in their functionality; requiring a user to run a graph query, extract the subgraph, and run separate analytics on the subgraph, often in a separate program or interface than that used to perform the graph query, which adds additional computation expense for data analysis or relational graphs.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage media are provided herein to enable query-time analytics on graph queries that span subgraphs. Instead of a user having to run a graph query and then perform analytics on the resulting subgraph via separate requests, the user is enabled to run analytics at the time the graph query is run via a single request to the graph database, which improves the computational efficiency of analyzing relational graphs, reduces the bandwidth required to receive relevant results, and thereby improves the functionality of the computing device running the queries and analytics.

The query-time analytics are integrated into the graph query within the language used for graph queries and may run iteratively within the context of one or more graph queries. The analytics are able to extend past the subgraph, into neighboring edges and nodes from the initial graph to analyze data related to those edges and nodes.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable devices embodying instructions are provided herein for reducing latencies and/or improving computational efficiency when analyzing data stored in a relational graph by integrating analytical capabilities into graph queries. Instead of a user having to run a graph query and then perform analytics on the resulting subgraph via separate requests, the user is enabled to run analytics at the time the graph query is run via a single request to the database maintaining the relationship graph, which improves the computational efficiency of analyzing relational graphs, reduces the bandwidth required to receive relevant results, and thereby improves the functionality of the computing devices hosting the relational graphs and running the queries and analytics.

Figure 1:
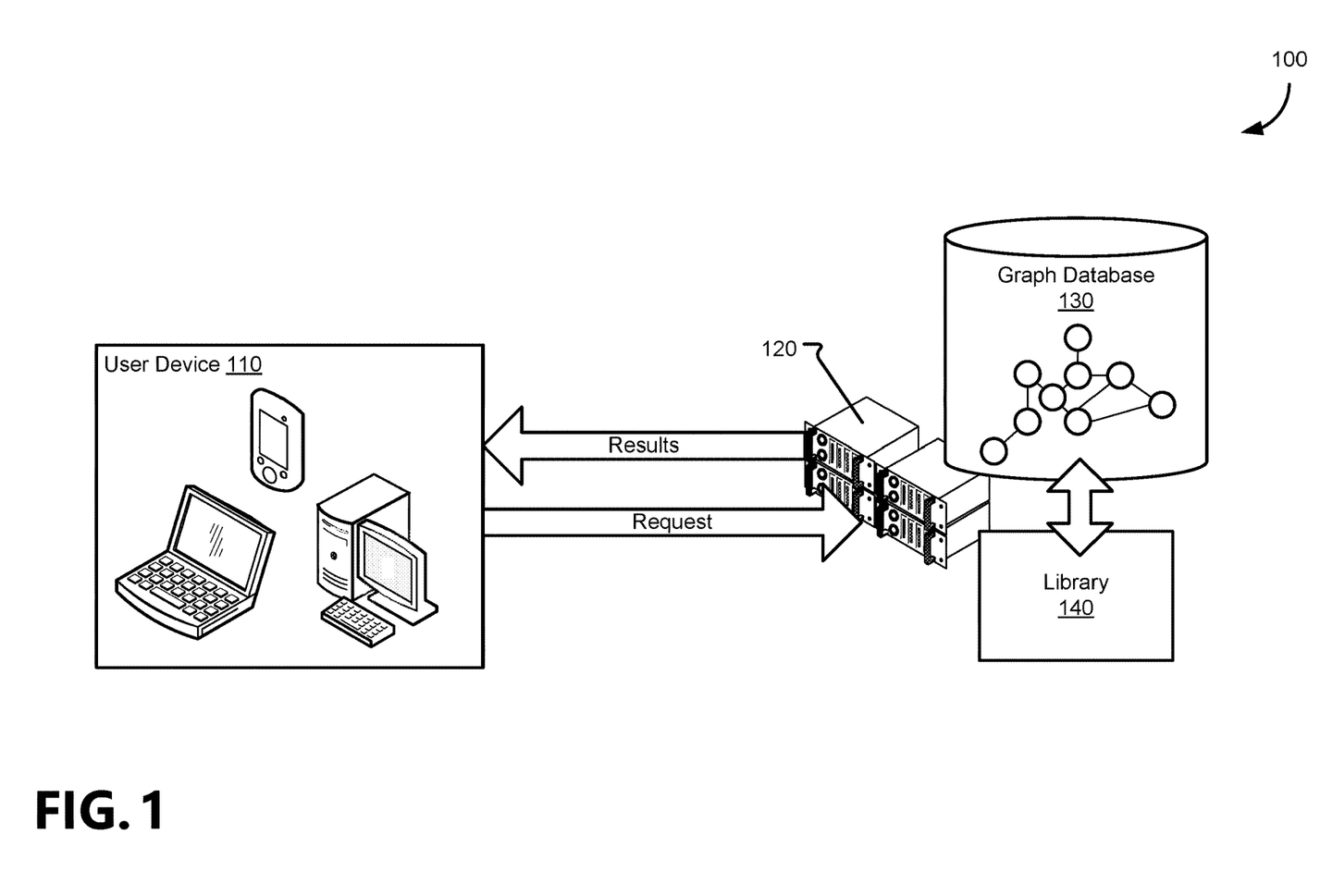
FIG. 1 illustrates an example environment in which the present disclosure may be practiced.

FIG. 1 illustrates an example environment 100 in which the present disclosure may be practiced. A user device 110 is in communication with a graph server 120, which maintains a relational graph in a graph database 130. A relational graph maintains several entities as nodes and the relationships between those nodes as edges connecting related nodes, and the graph database 130 is operable to store one or more relational graphs and subgraphs thereof for the user device 110 to query and perform analytics thereon. The analytics are invoked by the request, which call an analytic library 140 stored by the graph server 120 to perform the analytic function at run time along with the query. The results of the request are then transmitted back to the user device 110.

Each of the user device 110 and graph server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 3 and 4. User devices 110 are operated by users, who may be humans or automated systems (e.g., "bots"). In various aspects, the user device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The graph server 120 hosts a graph database 130 of a relational graph with nodes describing entities and a set of accompanying properties of those entities, such as, for example, the names, titles, ages, addresses, etc. Each property can be considered a key/value pair—a name of the properties and its value. In other examples, entities represented as nodes that include documents, meetings, communication, etc., as well as edges representing relations among these entities, such as an edge between a person node and a document node representing that person's authorship, modification, or view of the document.

The graph server 120 executes graph queries that are submitted by various users. The graph server 120 is also operable to access the graph structure description, which resides in the graph database 130, which may include, in various aspects: a relational database, a NoSQL database, or any other database. Subgraphs or views of the relational graph are stored in the graph database 130 for later analysis or subsequent graph queries for the same metrics in various aspects. In some aspects, when the graph server 120 produces a subgraph in response to a graph query, the graph server 120 checks whether a subgraph that will satisfy the graph query exists in the graph database 130, and will produce that subgraph by retrieving it from the graph database 130, otherwise the graph server 120 will produce the subgraph by executing the graph query, and may optionally store the resulting subgraph for later retrieval.

The graph server 120 is further operable to receive a request from the user device 110 that includes a query formatted in the graph query language and an analytic formatted according to a second language by which to extend the graph query. The graph query is used to produce a subgraph or view of the relational graph that meets various criteria supported by the graph query language, and the graph server 120 calls the library 140 to extend the graph query based on the analytic.

The library 140 defines one or more functions associated with analytics in a second language that is "foreign" to the graph database 130 (i.e., not in the graph query language). In various aspects, the library 140 is a binary, a self-contained executable, a dynamic-link library (DLL), a shared library or shared object. The arguments of the analytic specify values for one or more properties of the nodes or edges that are used to refine the subgraph or view produced by the query. In some aspects, the analytic refines the subgraph or view produced by the graph query based on the returned properties to provide an ordered list of the nodes according to the properties analyzed by the analytic (e.g., the nodes in an order of greatest to least in terms of relatives values of the associated property). In other aspects, the analytic refines the graph query to produce a reduced size subgraph or view (e.g., removing nodes or edges not having a given property). Returning a reduced size subgraph requires less bandwidth to be used to transmit relevant results to the user device 110, but also provides additional privacy control over the results. For example, for a graph query requesting "documents trending around user X" on a relational graph with edges representing document views may be configured to preserve privacy by excluding results that return documents to which the user device 110 lacks permission to view or access (e.g., a "hidden" document or password protected document/filepath), results that indicate that user X interacted with the document fewer than n number of times, or results that indicate that user X interacted with the document for an amount of time less than t.

In yet other aspects, the analytic refines the graph query to return a value of a property instead of a subgraph or view (e.g., the maximum, minimum, average (mean, median or mode) value for a property of the subgraph). In various aspects, the library 140 is already installed on the graph server 120 at the time the request is received from the user device 110, but in additional aspects, the request is transmitted with a library 140 or specifies a library 140 that the graph server 120 will obtain and use in response to receiving the request.

Requests, in some aspects, contain nested or iterative queries and analytics. In one example, a request includes a query that is to be run on the results of another query. In another example, the request includes a query that is to be run on the results of an analytic of another query. In a further example, the request includes an analytic that is to be run on the results of another analytic. As will be appreciated, several queries and analytics may be included in various aspects of an iterative request, which the graph server 120 is operable to run before returning results to the user device 110.

Once the request has been fully run, the graph server 120 transmits the refined results to the user device 110. Because the query and the analytic take place on the graph server 120, the user device 110 does not need to run additional processor-intensive operations on the results it receives from the graph server 120, and the amount of data that are transmitted from the graph server 120 to the user device 110 (and the required bandwidth to send that data) is reduced.

Figure 2:
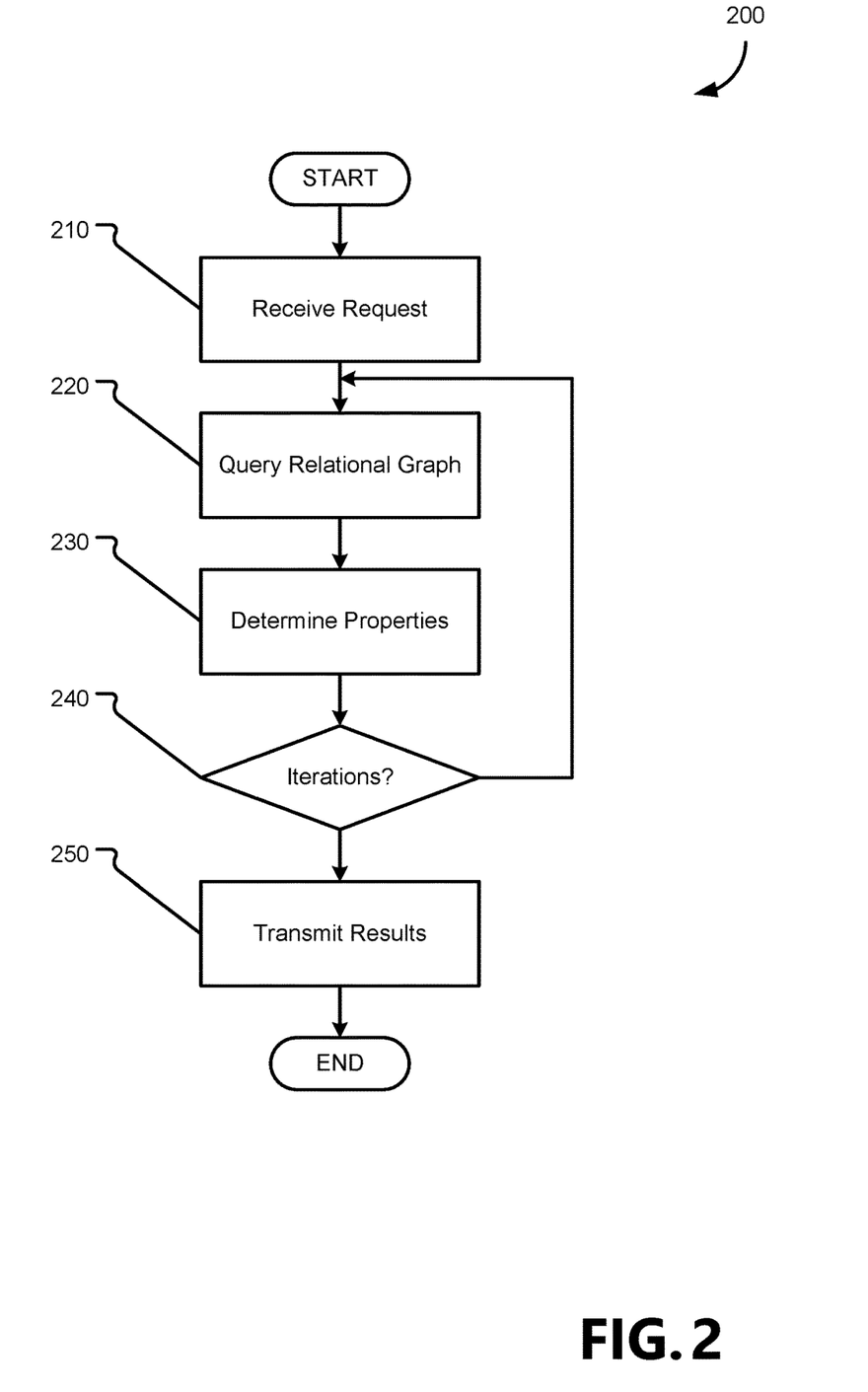
FIG. 2 is a flow chart showing general stages involved in an example method for implementing integrated graph queries and analytics to extend graph queries.

FIG. 2 is a flow chart showing general stages involved in an example method 200 for implementing integrated graph queries and analytics to extend graph queries. Method 200 begins at OPERATION 210, where the graph server 120 receives a request for a view of a hosted relational graph. In various aspects the request may be a query for a subgraph or may integrate an analytic along with a query of the relational graph. Additionally, in various aspects, the received request may include or request the download of a library 140 to perform the analytic or may call a library 140 that is already stored by the graph server 120.

For example, a user of a user device 110 may transmit a request to a graph server 120 hosting a relational graph for a social network (for personal connections or institutional connections) for the persons who are listed as managers (a query of the nodes) in the relational graph and ask for the X persons of the resulting subgraph who are the most senior managers (an analysis of the subgraph). In another example, for a relational graph of websites comprising the Internet, a user may request, via a single transmission, websites that match a search query and have those sites returned in a ranked order from the graph server 120 according to a metric or method specified by an analytic function called from the request.

Proceeding to OPERATION 220, the query is used to access a view of the relational graph. In various aspects, the view of the relational graph may be created in response to the query, or may be accessed from storage on the graph server 120 from a saved view created in response to an earlier query. In response to the view being created in response to a query, the subgraph may be saved to the graph server 120 for later access by subsequent queries and analytics, which may be part of new requests or part of a request with iterative queries and analytics.

To illustrate a query, consider the example shown in CODE 1. In CODE 1, a query that is part of a request for the names of persons in an organization who have the title of "manager" may be formatted as shown. In different aspects the query may be formatted according to different query languages that access the relational graphs and subgraphs thereof, and one of ordinary skill in the art will be familiar with the relevant query languages, which include, but are not limited to: Cypher, FQL (Facebook Query Language), and SQL (Structured Query Language). The query shown in CODE 1 requests the entities from the relational graph that have a title property that matches the argument of 'manager' and returns as its output the names of those entities as either a list or as a view (e.g., a subgraph) of the relational graph that was queried.

| CODE 1: | MATCH (entity {title:"manager"}) RETURN entity.name |
|---|---|

At OPERATION 230 the properties of the accessed subgraph are determined according to an analytic included in the request. The properties further refine the result provided to the requesting user and extend the query language to include functionality that is otherwise foreign to that language. The analytic extends the request by invoking a library 140 or other input/output handler that includes functions in a language other than the graph query language.

To illustrate an analytic, consider the example shown in CODE 2, which extends the query discussed in CODE 1 to include an 'authority' library 140 which includes the analytic code used to extend the request inline with the query formatted according to graph query language. In various aspects, the analytic code is expressed in a language foreign to the particular graph query language used. For example, the analytic function may be expressed in C#, C++, Java, or any other programming language familiar to one of ordinary skill in the art and is compilable by the graph server 120.

| CODE 2: | MATCH (entity {title:"manager"}) LIBRARY authority ( ) RETURN entity.name, authority(entity).score |
|---|---|

Method 200 proceeds to DECISION 240 where it is determined whether the extended query is iterative. Iterative extended queries allow for one or more analytics to make multiple passes over the graphs spanned by one or more queries to further refine the results at query-time. For example, a user may submit a query or graph analytic that acts upon the results of another query or its associated analytic. As will be appreciated, in various aspects, queries may iterate on queries (spanning the subgraph of an earlier query), analytics may iterate on analytics (refining an earlier refinement), and analytics and queries may iterate on one another (spanning a refinement or refining a spanned subgraph). In some aspects, the library 140 is configured according to an iterative framework (e.g., the bulk synchronous parallel model), which allows for a single call to iterate its results a set number of times, until a given size result set is produced, or for a given computational time (e.g., provide results within m minutes).

One example of an iterative query is a query for an entity that is associated with a given title (a first graph query), having a given level of authority (a first analytic) that is within a set number of edges away from a second entity (a second, iterative graph query). A first query and its analytic provide a subgraph of the initial graph which the second (and subsequent) graph queries and analytics are based on. When it is determined that the extended query is iterative, method 200 returns to OPERATION 220 for the next graph query in the iterative graph query to be run on the relational graph. When it is determined that the extended query is not iterative, or that the graph query or analytic that were performed were the last graph query or analytic of an iterative query, method 200 proceeds to OPERATION 250.

At OPERATION 250, the results of the query are transmitted to the user device 110 that submitted the request received in OPERATION 210. In various aspects, the results may be transmitted as a view of the relational graph, a sub-graph, or as another format of data that answer an analytic, such as, for example, a string, an integer, a double, etc. Method 200 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
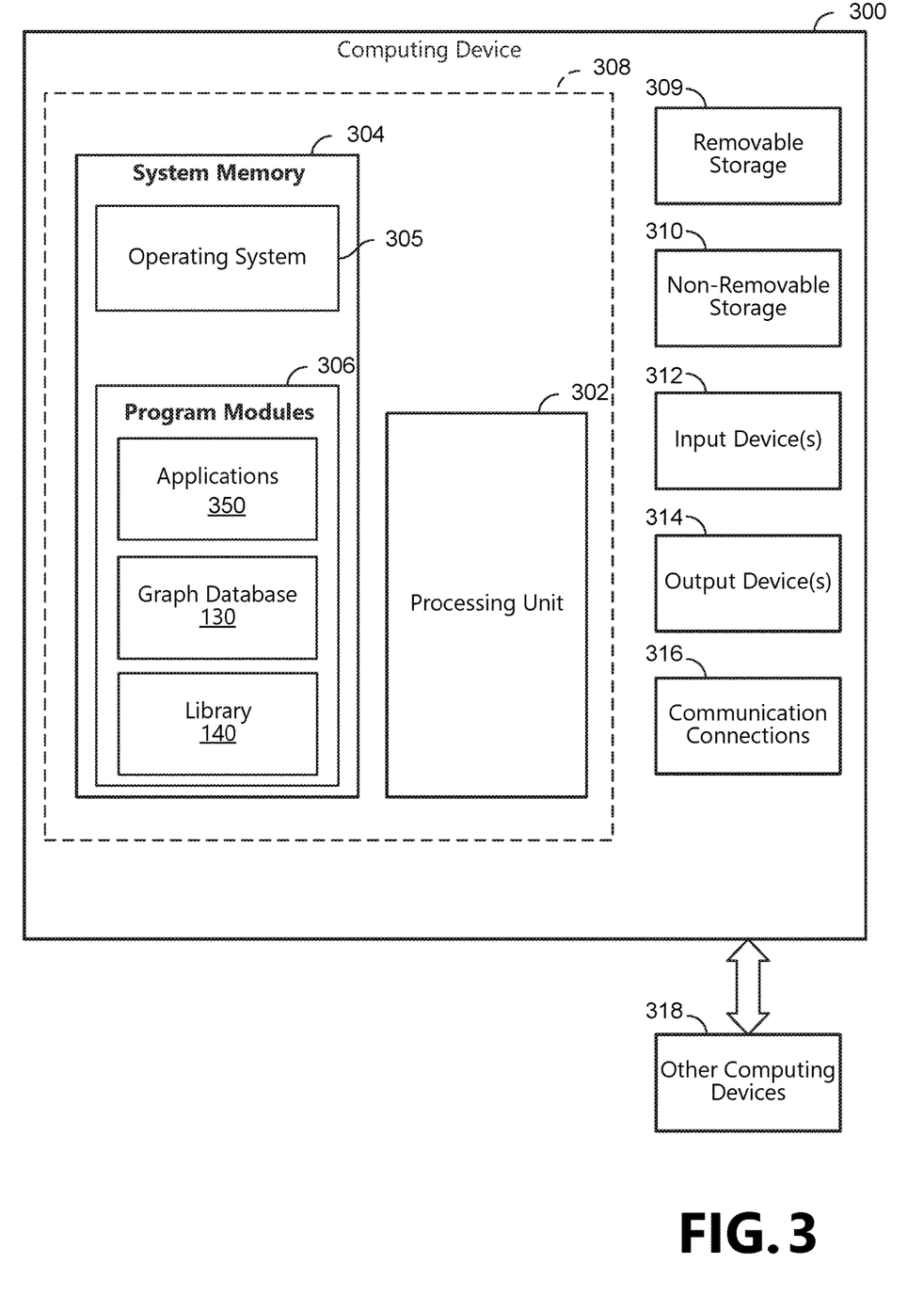
FIG. 3 is a block diagram illustrating example physical components of a computing device.
Figure 4:
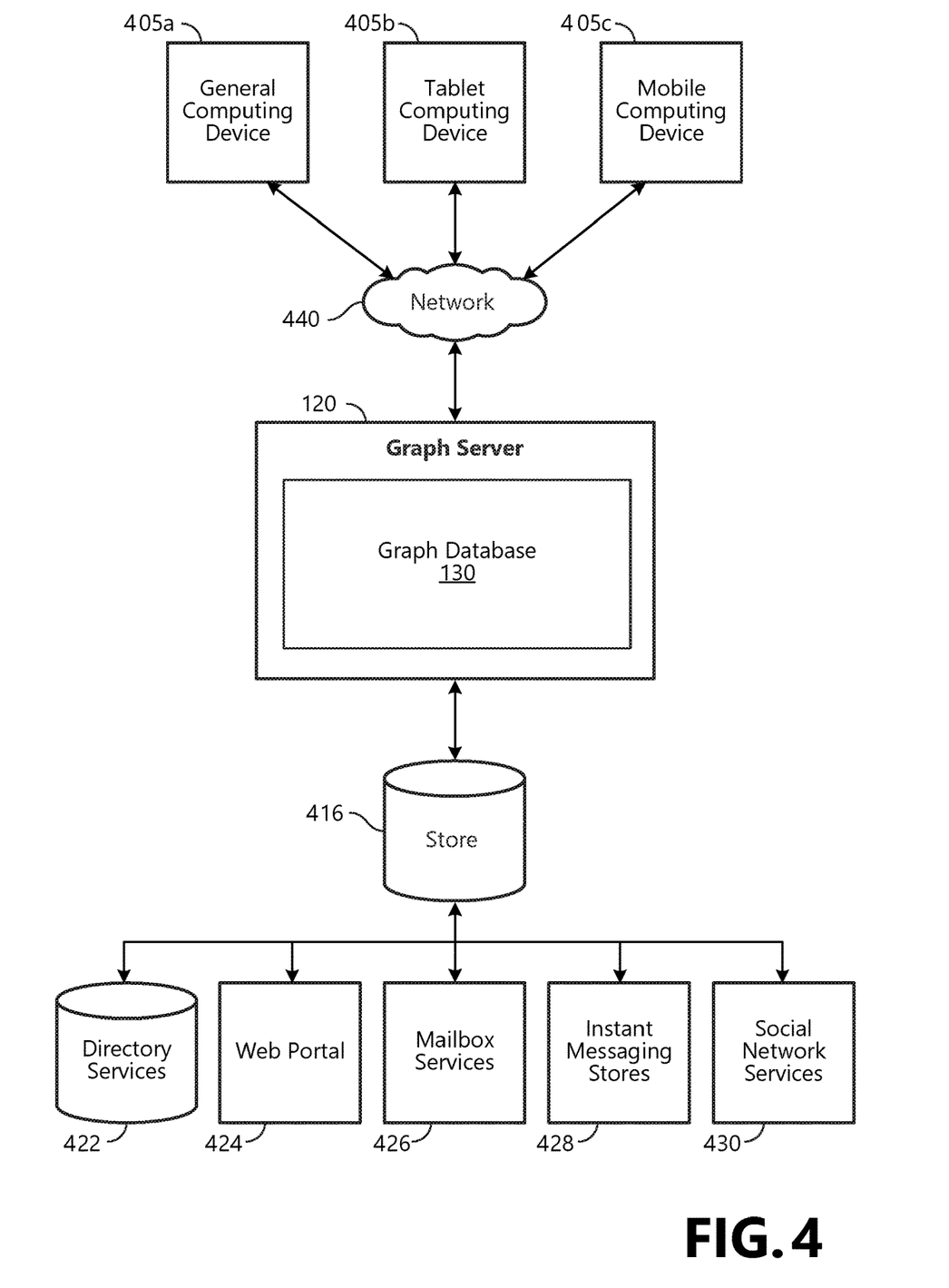
FIG. 4 is a block diagram of a distributed computing system.

FIGS. 3-4 and the associated descriptions provide a discussion of a variety of operating environments in which examples are practiced. However, the devices and systems illustrated and discussed with respect to FIGS. 3-4 are for purposes of example and illustration and are not limiting of a vast number of computing device configurations that are utilized for practicing aspects, described herein.

FIG. 3 is a block diagram illustrating physical components (i.e., hardware) of a computing device 300 with which examples of the present disclosure may be practiced. In a basic configuration, the computing device 300 includes at least one processing unit 302 and a system memory 304. According to an aspect, depending on the configuration and type of computing device, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software applications 350. According to an aspect, the system memory 304 includes the graph database 130 and the library 140. The operating system 305, for example, is suitable for controlling the operation of the computing device 300. Furthermore, aspects are practiced in conjunction with a graphics library, other operating systems, or any other application program, and are not limited to any particular application or system. This basic configuration is illustrated in FIG. 3 by those components within a dashed line 308. According to an aspect, the computing device 300 has additional features or functionality. For example, according to an aspect, the computing device 300 includes additional data storage devices (removable and/or non-removable) such as, for example, magnetic disks, optical disks, or tape. Such additional storage is illustrated in FIG. 3 by a removable storage device 309 and a non-removable storage device 310.

As stated above, according to an aspect, a number of program modules and data files are stored in the system memory 304. While executing on the processing unit 302, the program modules 306 (e.g., library 140) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 300 has one or more input device(s) 312 such as a keyboard, a mouse, a pen, a sound input device, a touch input device, etc. The output device(s) 314 such as a display, speakers, a printer, etc. are also included according to an aspect. The aforementioned devices are examples and others may be used. According to an aspect, the computing device 300 includes one or more communication connections 316 allowing communications with other computing devices 318. Examples of suitable communication connections 316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. According to an aspect, any such computer storage media is part of the computing device 300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIG. 4 illustrates one example of the architecture of a system reducing bandwidth consumption by extending graph queries as described above. Content developed, interacted with, or edited in association with the graph database 130 is enabled to be stored in different communication channels or other storage types. For example, various documents may be stored using a directory service 422, a web portal 424, a mailbox service 426, an instant messaging store 428, or a social networking site 430. The graph database 130 is operative to use any of these types of systems or the like for reducing bandwidth consumption by extending graph queries, as described herein. According to an aspect, a graph server 120 provides the graph database 130 to clients 405a,b,c. As one example, the graph server 120 is a web server providing the graph database 130 over the web. The graph server 120 provides the graph database 130 over the web to clients 405 through a network 440. By way of example, the client computing device is implemented and embodied in a personal computer 405a, a tablet computing device 405b or a mobile computing device 405c (e.g., a smart phone), or other computing device. Any of these examples of the client computing device are operable to obtain content from the store 416.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for extending graph queries to refine results prior to transmission, the method comprising:
   receiving, from a user device at a graph server hosting a graph database, a request that includes a graph query comprising criteria to produce a subgraph and an analytic including one or more properties for use in refining the subgraph produced;
   querying the graph database according to the criteria of the graph query to produce the subgraph;
   extending the graph query based on the one or more properties included in the analytic at a same time the graph database is being queried;
   refining the subgraph based on the analytic; and
   returning the refined subgraph to the user device.

2. The method of claim 1, wherein extending the graph query based on the analytic comprises:
   identifying properties of the subgraph.

3. The method of claim 2, wherein refining the subgraph comprises:
   refining the subgraph further based on the properties of the subgraph.

4. The method of claim 3, further comprising:
   determining an order associated with the refined subgraph based on values of the properties of the subgraph; and
   returning the refined subgraph to the user device according to the order.

5. The method of claim 3, further comprising:
   reducing a size of the refined subgraph relative to the subgraph based on values of the properties of the subgraph.

6. The method of claim 2, further comprising:
   returning values of the properties of the subgraph, the values including one or more of a maximum value, a minimum value, and an average value.

7. The method of claim 1, further comprising:
   prior to returning the refined subgraph to the user device, one or more of:
      iteratively refining the subgraph based on an additional graph query included in the request; and
      iteratively extending the graph query and refining the subgraph based on an additional analytic included in the request.

8. The method of claim 1, wherein extending the graph query further comprises:
   calling a library defining one or more functions foreign to a graph query language in which the graph query is formatted, wherein the analytic references the one or more functions inline with the graph query.

9. A server for extending graph queries to refine results prior to transmission, comprising:
   a processing unit; and
   a memory coupled to the processing unit and storing instructions that, when executed by the processing unit, cause the processing unit to:
      receive, from a user device, a request that includes a graph query comprising criteria to produce a subgraph and an analytic including one or more properties for use in refining the subgraph produced;
      query a graph database hosted by the server according to the criteria of the graph query to produce the subgraph;
      extend the graph query based on the one or more properties included in the analytic;
      refine the subgraph based on the analytic; and
      return the refined subgraph to the user device.

10. The server of claim 9, wherein the graph query is formatted in a first language, the analytic is formatted in a second language, and the processing unit is further caused to:
    produce the subgraph based on the criteria that is supported by the first language of the graph query; and
    call a library to extend the graph query based on the analytic, wherein the library defines one or more functions in the second language that are referenced by the analytic inline with the graph query.

11. The server of claim 10, wherein the library is one of:
    stored on the server prior to receiving the request;
    included within the request; or
    specified within the request, wherein the processing unit is further caused to download the library for storage on the server.

12. The server of claim 9, wherein the graph database includes a relational graph comprising entities represented as nodes and relationships between the entities represented as edges connecting related nodes, and the subgraph produced is a subgraph of the relational graph.

13. The server of claim 12, wherein the subgraph produced includes a subset of the nodes matching the criteria and associated edges that are connected to a node within the subset of the nodes.

14. The server of claim 13, wherein the subgraph is further refined based on a property of one or more of the subset of the nodes and the associated edges.

15. The server of claim 14, wherein to refine the subgraph based on the analytic, the processing unit is further caused to:
    order the subset of the nodes based on a value of the property for each node within the subset of the nodes.

16. The server of claim 14, wherein to refine the subgraph based on the analytic, the processing unit is further caused to:
    reduce a size of the subgraph by removing, from the subset of the nodes and the associated edges, one or more nodes and edges not having the property.

17. The server of claim 9, wherein the processing unit is further caused to:
    store the refined subgraph in the graph database for use in producing subsequent subgraphs.

18. Computer storage media including instructions, which when executed by a processing unit perform a method for extending graph queries to refine results prior to transmission, the instructions comprising:
    receiving, from a user device at a graph server hosting a graph database that includes a relational graph, a request that includes a graph query comprising criteria to produce a view of the relational graph and an analytic including one or more properties for use in refining the view produced;
    querying the graph database according to the criteria of the graph query to produce the view;
    extending the graph query based on the one or more properties included in the analytic;
    refining the view based on the analytic; and
    returning the refined view to the user device.

19. The computer storage media of claim 18, wherein the relational graph comprises entities represented as nodes and relationships between the entities represented as edges connecting related nodes, the view produced includes a subset of the nodes matching the criteria of the graph query and associated edges that are connected to a node within the subset of the nodes, and the view is refined based on a property of one or more of the subset of the nodes and the associated edges that is specified by the analytic.

20. The computer storage media of claim 18, wherein the request includes one or more of an additional graph query and an additional analytic, and prior to returning the refined view to the user device, the instructions further comprise one or more of:
- iteratively refining the view based on the additional graph query; and
- iteratively extending the graph query and refining the view based on the additional analytic.

* * * * *